(12) United States Patent
Hirabayashi et al.

(10) Patent No.: US 8,564,236 B2
(45) Date of Patent: Oct. 22, 2013

(54) POWER TOOL

(75) Inventors: Shinji Hirabayashi, Anjo (JP); Shusuke Ito, Anjo (JP)

(73) Assignee: Makita Corporation, Anjo-Shi (JP)

( * ) Notice: Subject to any disclaimer, the term of this patent is extended or adjusted under 35 U.S.C. 154(b) by 267 days.

(21) Appl. No.: 12/952,575

(22) Filed: Nov. 23, 2010

(65) Prior Publication Data
US 2011/0127941 A1 Jun. 2, 2011

(30) Foreign Application Priority Data
Nov. 27, 2009 (JP) .................. 2009-270301

(51) Int. Cl.
H02P 7/00 (2006.01)
H02H 7/085 (2006.01)

(52) U.S. Cl.
CPC ................. H02H 7/085 (2013.01)
USPC .......... 318/476; 318/471; 318/472; 318/473; 318/474; 318/475

(58) Field of Classification Search
CPC .................................................. H02H 7/085
USPC ................... 318/476, 471–475; 173/178, 181
See application file for complete search history.

(56) References Cited

U.S. PATENT DOCUMENTS

| | | | | |
|---|---|---|---|---|
| 5,627,441 A * | 5/1997 | Sakurai et al. | | 318/599 |
| 5,738,177 A | 4/1998 | Schell et al. | | |
| 5,739,651 A * | 4/1998 | Miyazawa et al. | | 318/400.34 |
| 5,992,257 A * | 11/1999 | Nemetz et al. | | 74/371 |
| 7,347,735 B2 * | 3/2008 | Naumann et al. | | 439/660 |
| 7,513,052 B2 * | 4/2009 | Milligan et al. | | 33/290 |
| 7,882,899 B2 * | 2/2011 | Borinato et al. | | 173/176 |
| 2009/0098971 A1 | 4/2009 | Ho et al. | | |
| 2009/0200961 A1 | 8/2009 | Straub | | |

FOREIGN PATENT DOCUMENTS

| | | |
|---|---|---|
| EP | 1 281 465 A1 | 2/2003 |
| EP | 2 030 710 A2 | 3/2009 |
| JP | A-9-155757 | 6/1997 |

OTHER PUBLICATIONS

Jan. 31, 2013 European Search Report issued in EP Application No. 10 192 709.3.

* cited by examiner

*Primary Examiner* — Bentsu Ro
*Assistant Examiner* — David Luo
(74) *Attorney, Agent, or Firm* — Oliff & Berridge, PLC

(57) ABSTRACT

A technique for providing a user with effective information in performing an operation is provided in a power tool having a speed change mechanism. A power tool has a speed change mechanism that switches a tool bit 113 from first drive mode in which the tool bit is driven at high speed and low torque to second drive mode in which the tool bit is driven at low speed and high torque, according to load on the tool bit 113. The power tool includes detecting and indicating device 161, 163, 167 that detect a predetermined status condition of the first drive mode and indicate switching from the first drive mode to the second drive mode before switching to the second drive mode.

7 Claims, 9 Drawing Sheets

POWER TOOL

BACKGROUND OF THE INVENTION

1. Field of the Invention

The invention relates to a hand-held power tool having a speed change mechanism for changing the rotation speed of a tool bit according to the load on the tool bit.

2. Description of the Related Art

Japanese non-examined laid-open patent publication No. H09-155757 discloses a hand-held power tool having a speed change mechanism for changing the rotation speed of a tool bit between high and low speeds. According to this known art, in addition to a speed change mechanism, a clutch is further provided on the downstream side of the speed change mechanism. Further, an LED indicator is provided which gives a visual indication to a user when a predetermine torque level is reached and the clutch is disengaged.

According to the known power tool, only the current drive status conditions is detected and indicated to the user of the power tool. On the other hand, in order for a smooth operation of the power tool, it is desired to provide the user with more operating information.

SUMMARY OF THE INVENTION

It is, accordingly, an object of the invention to provide a technique for providing a user with more effective information in performing an operation of the power tool.

Above described object can be achieved by the claimed invention. According to the invention, a representative power tool is provided to include a speed change mechanism that switches a tool bit, according to the load on the tool bit, from first drive mode in which the tool bit is driven at predetermined speed and torque to second drive mode in which the tool bit is driven at lower speed and higher torque than the first drive mode, The "power tool" according to the invention may preferably include various kinds of power tools such as a circular saw or electric cutter for woodworking or metalworking which performs a cutting operation on a workpiece by a rotating saw blade, a driver drill for screw tightening or drilling operation, a driver and a wrench for screw tightening operation, a sander which performs grinding or polishing operation on a workpiece by a rotating sanding disc, a diamond core drill for drilling a relatively large-diameter hole, and a hedge trimmer for trimming a hedge by reciprocating upper and lower blades in opposite directions.

The representative power tool according to the invention further includes a detecting device and an indicating device. The detecting device is provided to detect a predetermined status condition of the first drive mode and the indicating device is provided to indicate switching from the first drive mode to the second drive mode before switching to the second drive mode. According to the predetermined status condition, imminent switching from the first drive mode to the second drive mode is predicted.

According to the invention, because the user is informed that switching from the first drive mode to the second drive mode in which heavier load condition than the first drive mode is imminently taking place, the user can prepare any increase of power output from low torque to high torque which is caused by switching of the speed change mechanism and can prepare against reaction caused in the power tool by the increase of power output.

According to a further aspect of the invention, the predetermined status condition may preferably be defined as a heavy load condition in which the tool bit is driven at a predetermined heavy load condition and switching from the first drive mode to the second drive mode is indicated when the detecting device detects the heavy load condition.

According to a further aspect of the invention, first and second rotating shafts parallel to each other may be provided. Further the speed change mechanism may have first and second power transmission paths via which torque is transmitted from the first rotating shaft to the second rotating shaft at different speed reduction ratios. The first power transmission path may be provided for use in the first drive mode and the second power transmission path may be provided for use in the second drive mode. Further, the speed change mechanism may have a switching actuation member that switches from the first power transmission path to the second power transmission path by moving according to the load on the tool bit. According to this aspect, by provision of the speed change mechanism with parallel shafts, the structure can be simplified.

According to a further aspect of the invention, the predetermined status condition may be detected by detecting the position of the switching actuation member as described above. For example, the switching actuation member may be represented by a clutch member moving in the longitudinal direction for speed change.

According to a further aspect of the invention, detecting and indicating devices detect and indicate the first and second drive modes. According to this invention, information relating to a current drive mode as well as an advance notice of switching from the first drive mode to the second drive mode can be indicated to the user.

According to a further aspect of the invention, detecting and indicating devices may further respectively detect and indicate a heavy load condition in the second drive mode. According to this aspect, during driving in the second drive mode, it can be indicated to the user that the drive status condition is a heavy load condition.

According to a further aspect of the invention, the indicating device may include a light emitting element.

According to a further aspect of the invention, the light emitting element is arranged to illuminate an area of operation of the tool bit.

Other objects, features and advantages of the present invention will be readily understood after reading the following detailed description together with the accompanying drawings and the claims.

BRIEF DESCRIPTION OF THE DRAWINGS

FIG. 10 illustrates the movement of the sliding engagement clutch, in which FIG. 10(A) shows the movement of cams and FIG. 10(B) shows the movement of the torque ring provided as a latching member.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
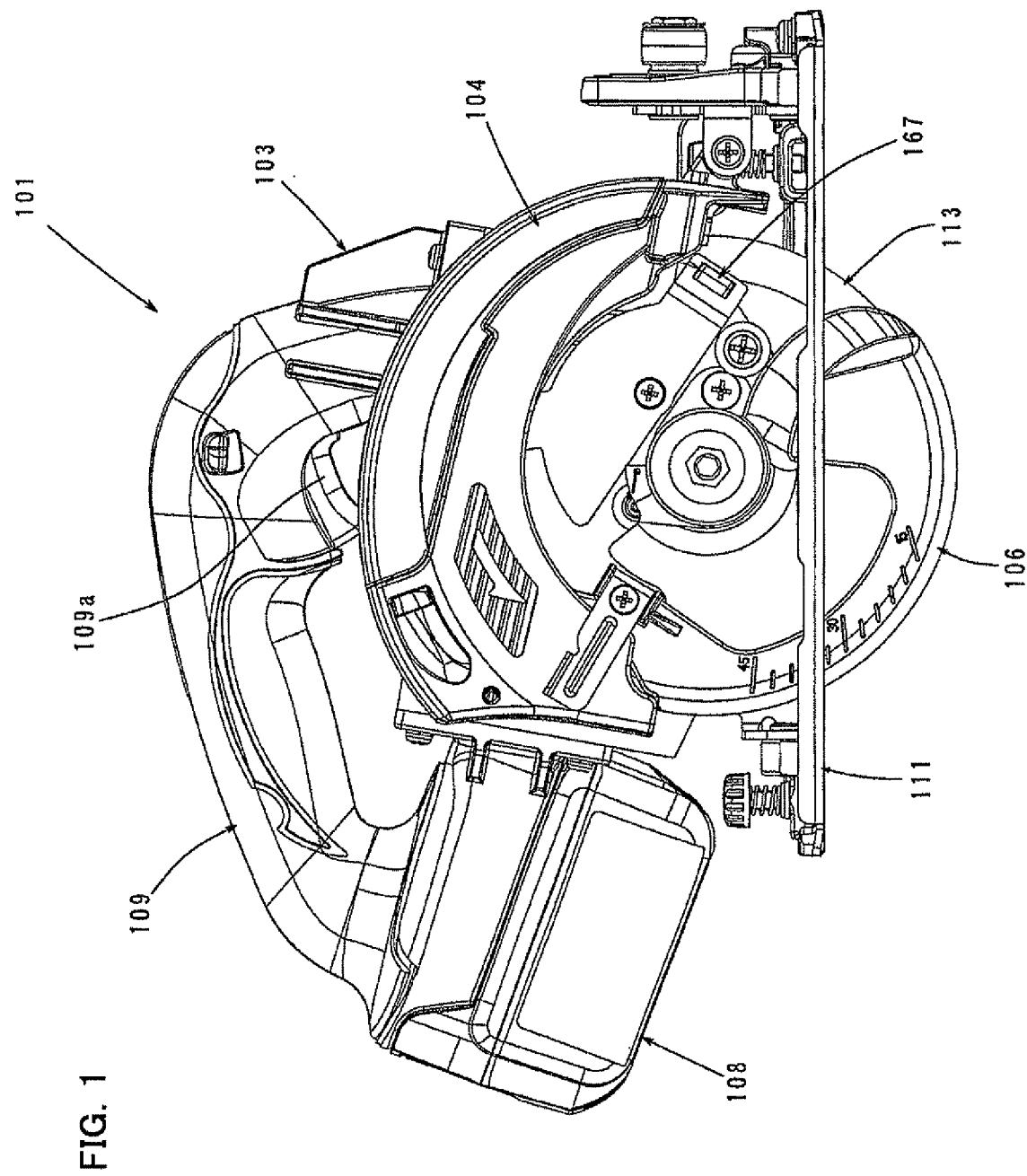
FIG. 1 is a side view showing an entire circular saw according to an embodiment of the invention.
Figure 2:
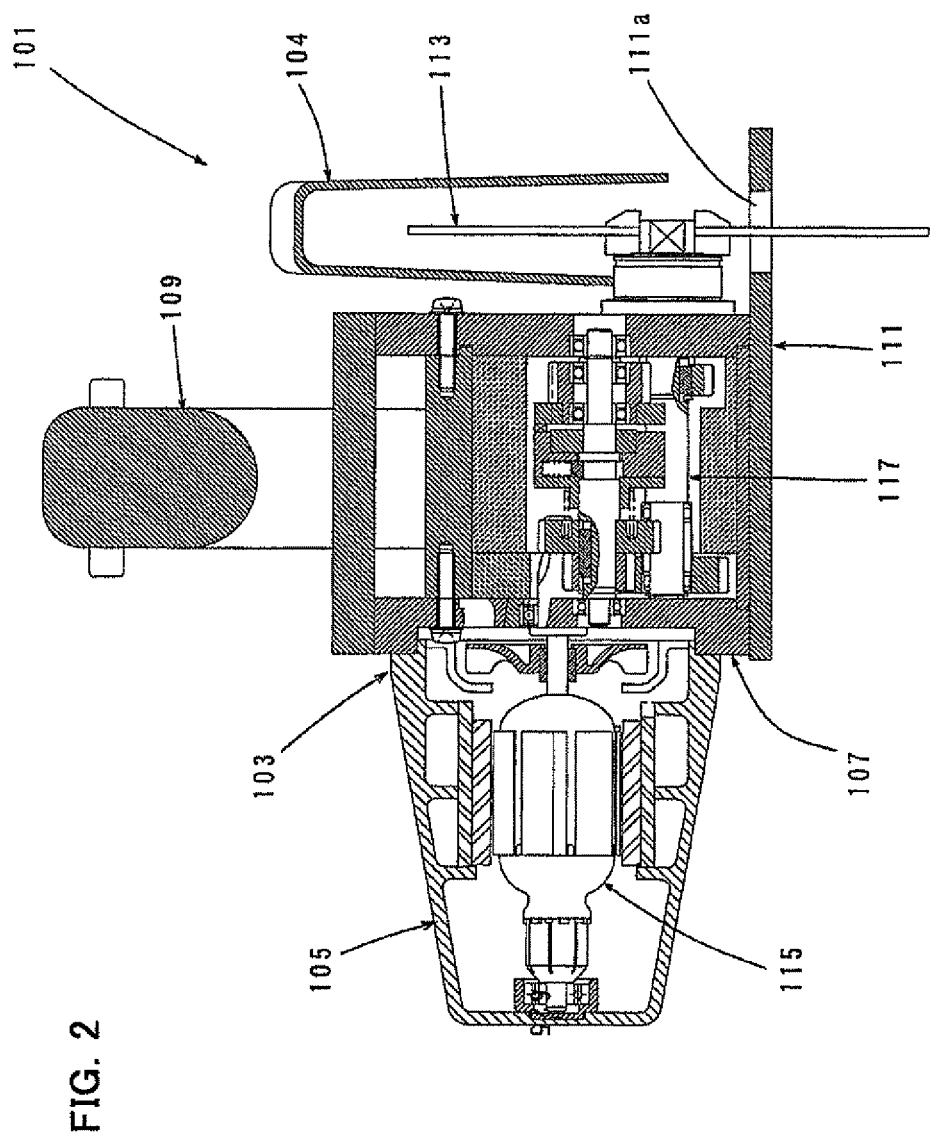
FIG. 2 is a sectional front view of the entire circular saw.

An embodiment of the invention is now explained with reference to FIGS. 1 to 12. A battery-powered circular saw having a battery is now explained as a representative embodiment of the power tool according to the invention. As shown in FIGS. 1 and 2, a circular saw 101 according to this embodiment includes a base 111 which can be placed on a workpiece (not shown) and moved in a cutting direction, and a power tool body in the form of a circular saw body 103 disposed above the base 111 and connected to the base 111.

The circular saw body 103 mainly includes a blade case 104 that covers substantially an upper half of a disc-like blade (saw blade) 113 which is rotated in a vertical plane, a motor housing 105 that houses a drive source in the form of the driving motor 115, a gear housing 107 that houses a speed change mechanism 117, and a handgrip 109 which is held by a user to operate the circular saw 101. The blade 113 is a feature that corresponds to the "tool bit" according to this invention.

A safety cover 106 is rotatably attached to the blade case 104 and covers a lower half of the blade 113. A lower edge portion of the blade 113 including the safety cover 106 protrudes from the underside of the base 111 through an opening 111a (see FIG. 2) of the base 111. In FIG. 2, the safety cover 106 is not shown. In cutting a workpiece, when the front end (the right end as viewed in FIG. 1) of the base 111 is placed on the workpiece and moved forward, the front end of the safety cover 106 is pushed by the workpiece, so that the safety cover 106 retracts and is housed within the blade case 104. The handgrip 109 is connected to an upper portion of the gear housing 107 and has a trigger switch 109a that is depressed by a finger of the user to drive the driving motor 115. The blade 113 is rotationally driven via the speed change mechanism 117 when the driving motor 115 is driven. Further, a battery 108 is detachably mounted to the end of the handgrip 109. The driving motor 105 in this embodiment is a rare earth motor with a brake. The battery 108 preferably comprises a lithium ion battery of 42 volts or less.

Figure 3:
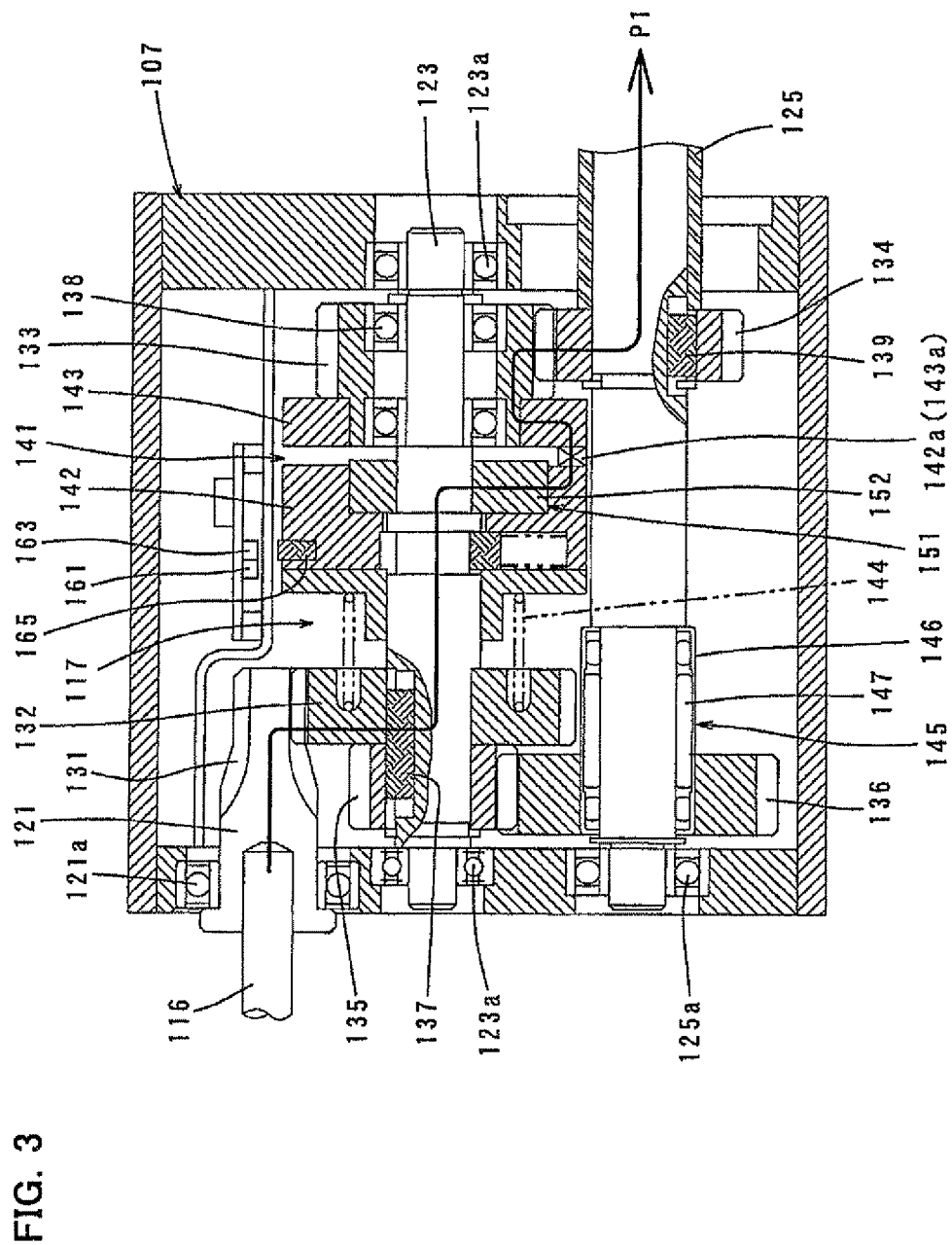
FIG. 3 is a developed sectional view of a parallel three-shaft type speed change mechanism in the state in which a power transmission path is switched to a high-speed low-torque path.
Figure 4:
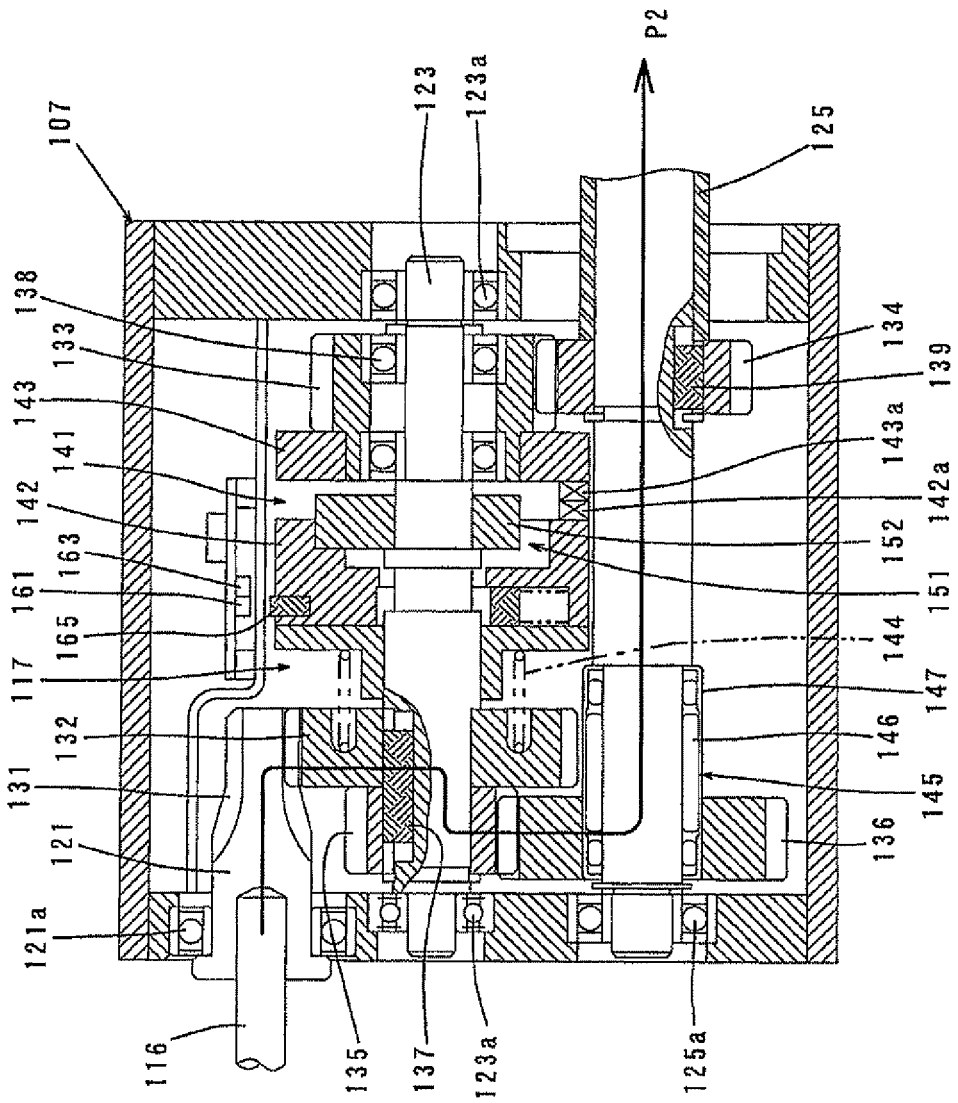
FIG. 4 is a developed sectional view of the parallel three-shaft type speed change mechanism in the state in which the power transmission path is switched to a low-speed high-torque path.

The speed change mechanism 117 is now explained with reference to FIGS. 3 and 4. The speed change mechanism 117 according to this embodiment is of a parallel three-shaft type having three shafts disposed parallel to each other, i.e. an input shaft 121 which is coaxially connected to a motor shaft 116 of the driving motor 115, an output shaft in the form of a blade mounting shaft 125 onto which the blade 113 is fitted, and an intermediate shaft 123 disposed between the input shaft 121 and the blade mounting shaft 125. The speed change mechanism 117 is of the two-stage switching type in which a power transmission path can be automatically switched between a high-speed low-torque path and a low-speed high-torque path according to the magnitude of load applied to the blade 113. The intermediate shaft 123 forms the "first rotating shaft" and the "upstream shaft", and the blade mounting shaft 125 forms the "second rotating shaft" and the "output shaft" according to this invention. FIGS. 3 and 4 are developed sectional views of the parallel three-shaft type speed change mechanism 117. FIG. 3 shows the state in which the power transmission path is switched to the high-speed low-torque path, and FIG. 4 shows the state in which the power transmission path is switched to the low-speed high-torque path. In the following description, the blade mounting shaft 125 is referred to as the output shaft.

The speed change mechanism 117 includes a first power transmission path P1 through which torque of the input shaft 121 is transmitted from a pinion gear 131 to the output shaft 125 via a first intermediate gear 132, the intermediate shaft 123, a second intermediate gear 133 and a first driven gear 134, and a second power transmission path P2 through which torque of the input shaft 121 is transmitted from the pinion gear 131 to the output shaft 125 via the first intermediate gear 132, the intermediate shaft 123, a third intermediate gear 135 and a second driven gear 136. The gear ratio (speed reduction ratio) between the second intermediate gear 133 and the first driven gear 134 is designed to be lower than the gear ratio (speed reduction ratio) between the third intermediate gear 135 and the second driven gear 136. Therefore, the first power transmission path P1 forms a high-speed low-torque power transmission path, and the second power transmission path P2 forms a low-speed high-torque power transmission path. The first and second power transmission paths P1, P2 are shown by bold arrowed line. The second intermediate gear 133 and the first driven gear 134 form the "first gear train" according to the invention, and the third intermediate gear 135 and the second driven gear 136 form the "second gear train" according to the invention.

The input shaft 121, the intermediate shaft 123 and the output shaft 125 in the speed change mechanism 117 are rotatably supported by the gear housing 107 via bearings 121a, 123a, 125a, respectively. A drive gear in the form of the pinion gear 131 is integrally formed on the input shaft 121. The first intermediate gear 132 and the third intermediate gear 135 are disposed side by side on one end region (on the driving motor 115 side or the left side as viewed in the drawing) of the intermediate shaft 123 and integrated with the intermediate shaft 123 via a common key 137. The first intermediate gear 132 is normally engaged with the pinion gear 131, and the third intermediate gear 135 is normally engaged with the second driven gear 136 provided on one end region of the output shaft 125. The second intermediate gear 133 is mounted for relative rotation on the other end region (on the blade 113 side or the right side as viewed in the drawing) of the output shaft 125 via a bearing 138 and normally engaged with the first driven gear 134. The first driven gear 134 is disposed on the other end region of the output shaft 125 and integrated with the output shaft 125 via a key 139.

In the circular saw 101 according to this embodiment, in an initial stage of a cutting operation of cutting a workpiece by the blade 113 in which the load applied to the blade 113 is relatively small, the output shaft 125 or the blade 113 is rotationally driven via the high-speed low-torque first power transmission path P1. Thereafter, when the load applied to the blade 113 reaches a predetermined value as the cutting operation proceeds, it is automatically switched to the low-speed high-torque second power transmission path P2. Such switching from the first power transmission path P1 to the second power transmission path P2 is realized by providing a sliding engagement clutch 141 on the intermediate shaft 123 and a one-way clutch 145 on the output shaft 125. The sliding engagement clutch 141 and the one-way clutch 145 form the "first and second clutches" according to this invention.

Figure 5:
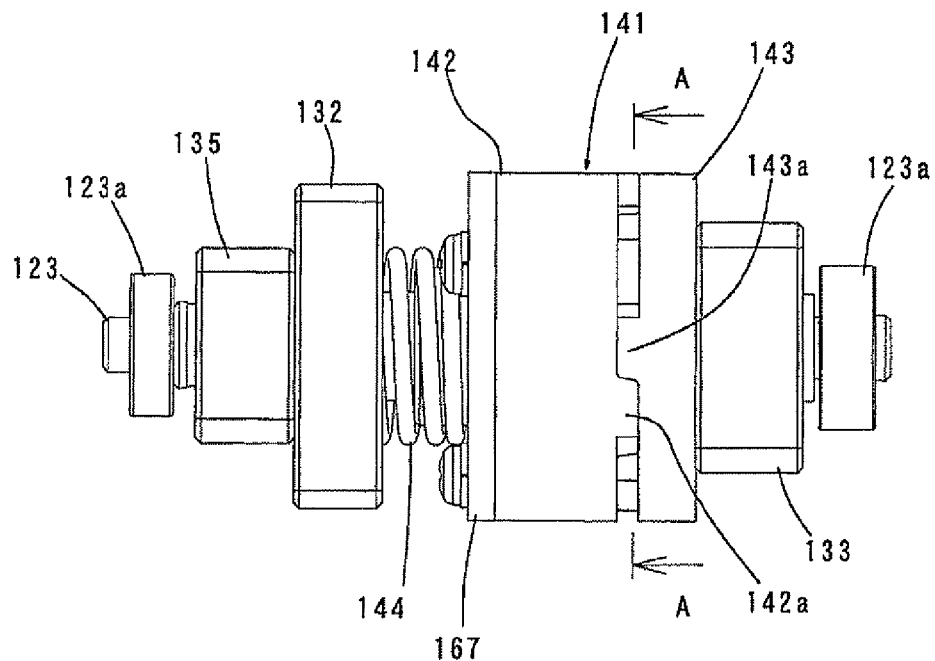
FIG. 5 is an external view of a sliding engagement clutch.
Figure 6:
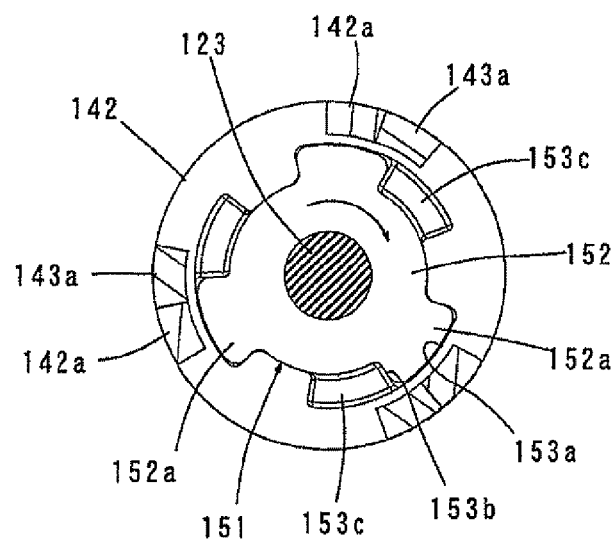
FIG. 6 is a sectional view taken along line A-A in FIG. 5.
Figure 7:
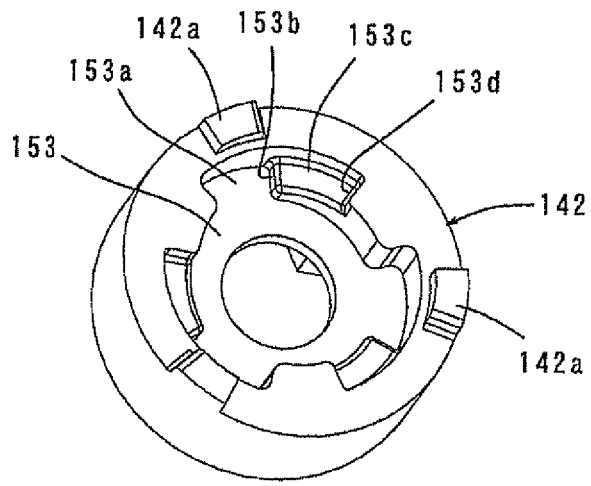
FIG. 7 is a perspective view showing a drive side clutch member in the sliding engagement clutch.
Figure 8:
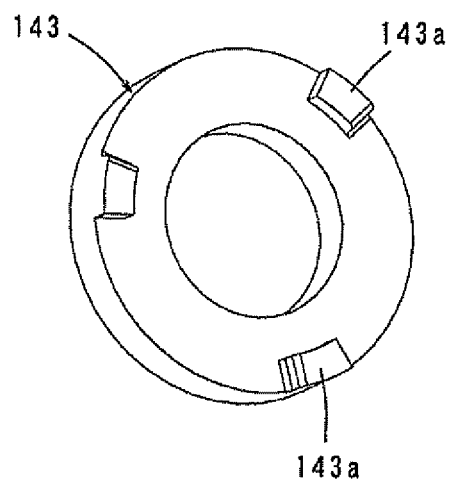
FIG. 8 is a perspective view showing a driven side clutch member in the sliding engagement clutch.

The construction of the sliding engagement clutch 141 is shown in FIGS. 5 to 10 as well as FIGS. 3 and 4. As shown in FIG. 5, the sliding engagement clutch 141 mainly includes the drive side clutch member 142 and the driven side clutch member 143 which face each other in the axial direction of the intermediate shaft 123, and a clutch spring 144 which presses and biases the drive side clutch member 142 toward the driven side clutch member 143. As shown in FIGS. 7 and 8, the drive side clutch member 142 and the driven side clutch member 143 have a plurality of (for example, three) generally trapezoidal cams 142a, 143a, respectively, in the circumferential direction on the respective sides facing each other. Torque is transmitted when the cams 142a, 143a are engaged with each other (see FIGS. 3 and 5), while the torque transmission is interrupted when the cams 142a, 143a are disengaged from each other (see FIG. 4).

Figure 9:
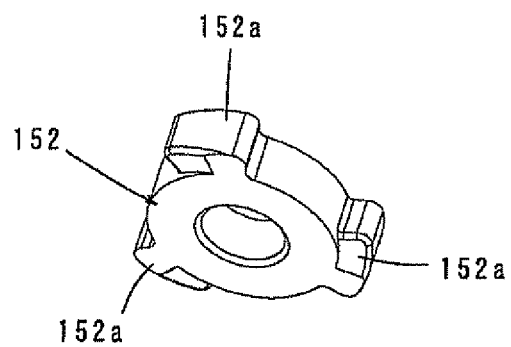
FIG. 9 is a perspective view showing a torque ring in the sliding engagement clutch.

The drive side clutch member 142 is loosely fitted onto the intermediate shaft 123. Specifically, the drive side clutch member 142 is mounted onto the intermediate shaft 123 such that it can slide with respect to the intermediate shaft 123 in the circumferential direction and the axial direction. The drive side clutch member 142 is rotationally driven via a torque transmission member in the form of the torque ring 152 which is press-fitted onto the intermediate shaft 123. As shown in FIG. 9, the torque ring 152 has a plurality of (three) torque transmission parts in the form of protrusions 152a which protrude radially outward and are evenly spaced in the circumferential direction. As shown in FIG. 7, a housing space 153 is formed in a side of the drive side clutch member 142 on which the cams 142a are formed, and has a shape generally corresponding to the contour of the torque ring 152. The torque ring 152 is housed in the housing space 153 such that the torque ring 152 cannot move in the circumferential direction with respect to the drive side clutch member 142 (see FIG. 6). Each of the protrusions 152a of the torque ring 152 is engaged with an engagement recess 153a of the housing space 153. Therefore, when the torque ring 152 is rotated together with the intermediate shaft 123, the protrusion 152a pushes a radial wall surface of the drive side clutch member 142 which faces the engagement recess 153a, or a torque transmission surface 153b, in the circumferential direction, so that the drive side clutch member 142 rotates together with the torque ring 152. Further, the driven side clutch member 143 is integrated with the second intermediate gear 133.

The drive side clutch member 142 is biased toward a power transmission position in which the cams 142a are engaged with the cams 143a of the driven side clutch member 143, by an elastic member in the form of a clutch spring 144 comprising a compression coil spring. The clutch spring 144 is elastically disposed between the drive side clutch member 142 and the first intermediate gear 132.

Figure 10:
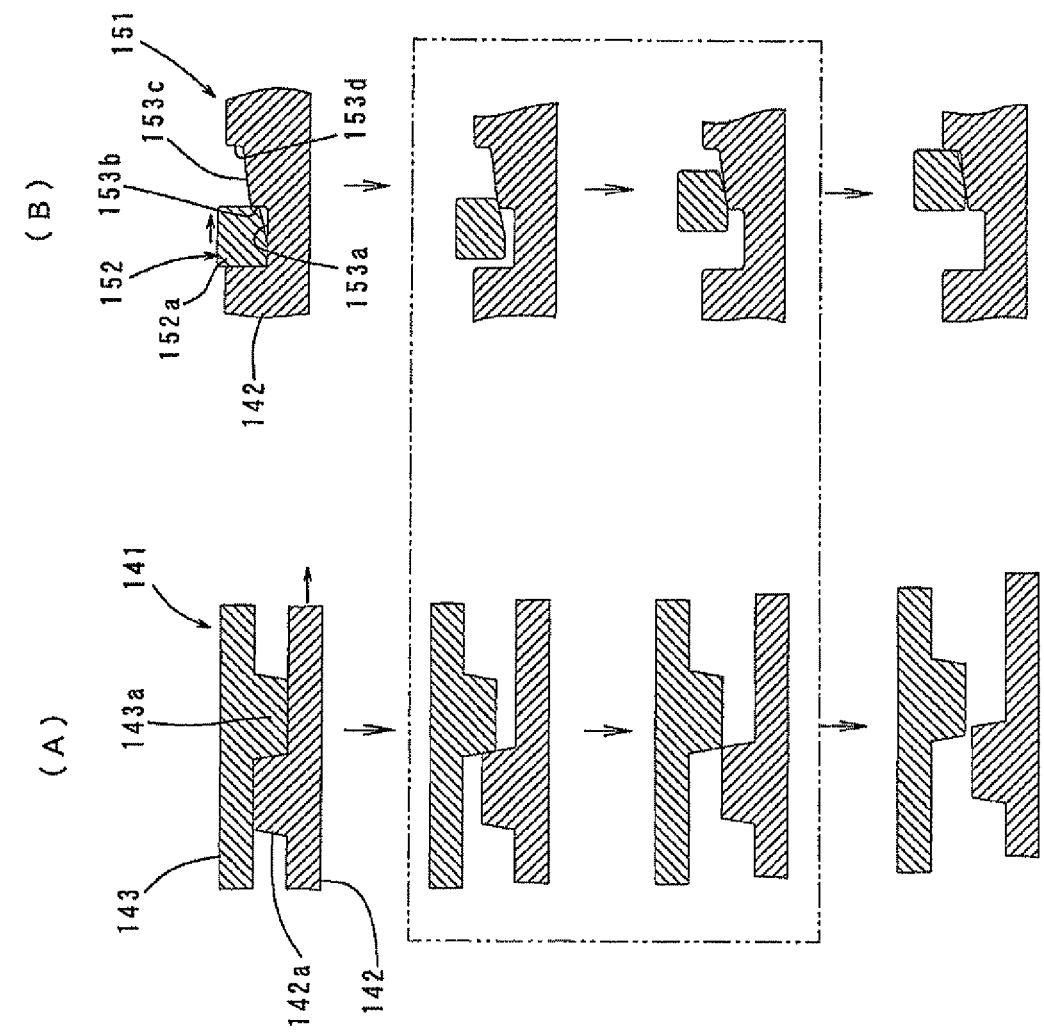

In the state in which the blade 113 is rotationally driven by using the first power transmission path P1, when the blade 113 is subjected to a load exceeding a predetermined value which overcomes the biasing force of the clutch spring 144, the drive side clutch member 142 is moved (retracted) away from the driven side clutch member 143 by components of a force acting upon inclined surfaces of the cams 142a, 143a in the longitudinal direction. Specifically, the drive side clutch member 142 is moved to a power release position and thus brought into a power transmission interrupted state by disengagement of the cams 142a, 143a. FIG. 10 (A) shows the sliding engagement clutch 141 shifting from the power transmission state to the power transmission interrupted state. When the sliding engagement clutch 141 is shifted to the power transmission interrupted state, the one-way clutch 145 is activated, so that the power transmission path is switched from the high-speed low-torque first power transmission path P1 to the low-speed high-torque second power transmission path P2.

Figure 11:
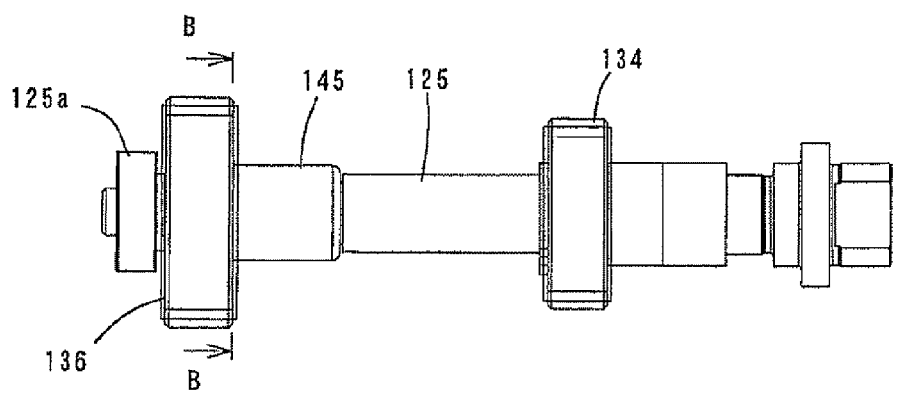
FIG. 11 is a side view showing parts provided on an output shaft.
Figure 12:
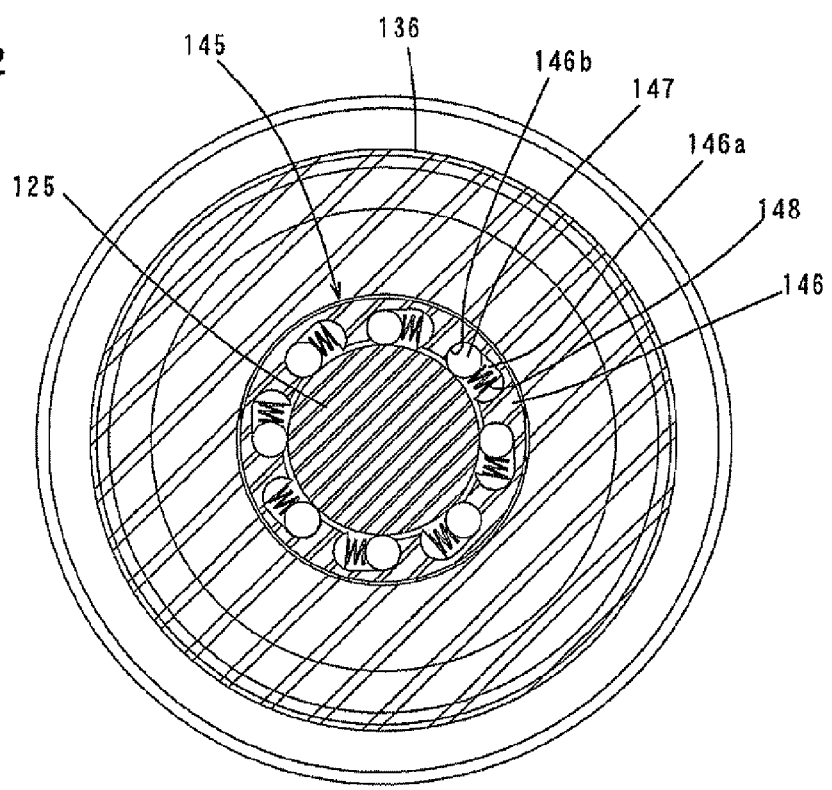
FIG. 12 is a sectional view taken along line B-B in FIG. 11.

The one-way clutch 145 is now explained. The construction of the one-way clutch 145 is shown in FIGS. 11 and 12. The one-way clutch 145 mainly includes an outer ring 146 that rotates together with the second driven gear 136, a plurality of needle rollers 147 and springs 148 which are disposed between the outer ring 146 and the output shaft 125. The needle rollers 147 are rotatably disposed in cam grooves 146a which are formed in the outer ring 146 at predetermined intervals in the circumferential direction, and biased by the springs 148 toward the position of engagement with cam faces 146b.

Therefore, when the outer ring 146 is rotated clockwise as viewed in FIG. 12 together with the first driven gear 134 with respect to the output shaft 125, the needle rollers 147 are engaged between the associated cam faces 146b and the output shaft 125 by the biasing force of the associated springs 148, and drive the output shaft 125 by a wedging action. This state is shown in FIG. 12. When the output shaft 125 rotates at higher speed than the outer ring 146, the outer ring 146 rotates counterclockwise as viewed in the drawing with respect to the output shaft 125. Therefore, the needle rollers 147 are disengaged from the associated cam faces 146b, so that the outer ring 146 idles with respect to the output shaft 125. Specifically, when the sliding engagement clutch 141 is in the power transmission state, the outer ring 146 rotates counterclockwise as viewed in the drawing with respect to the output shaft 125, so that the one-way clutch 145 idles and does not transmit power.

With the speed change mechanism 117 constructed as described above, when the driving motor 115 is stopped, the sliding engagement clutch 141 is held such that the drive side clutch member 142 is biased toward the driven side clutch member 143 by the biasing force of the clutch spring 144. Specifically, it is held in the power transmission state in which the cams 142a, 143a of the clutch members 142, 143 are engaged with each other. In this state, when the driving motor 115 is driven to perform a cutting operation on a workpiece, the torque of the driving motor 115 is transmitted to the output shaft 125 via the first power transmission path P1. Specifically, the blade 113 is rotated at high speed and low torque via the pinion gear 131, the first intermediate gear 132, the intermediate shaft 123, the sliding engagement clutch 141, the second intermediate gear 133, the first driven gear 134 and the output shaft 125.

At this time, the outer ring 146 of the one-way clutch 145 is also rotated via the intermediate shaft 123, the third intermediate gear 135 and the second driven gear 136. As described above, however, the outer ring 146 idles because the output shaft 125 rotates at higher speed than the outer ring 146.

As described above, a cutting operation on a workpiece by the blade 113 starts at high speed and low torque via the first power transmission path P1. Thereafter, when the load applied to the blade 113 reaches a switching set value defined by the clutch spring 144 of the sliding engagement clutch 141, the sliding engagement clutch 141 is shifted to the power transmission interrupted state. Specifically, as shown in FIG. 10(A), the drive side clutch member 142 is moved away from the driven side clutch member 143 against the biasing force of the clutch spring 144 by components of the force acting upon the drive side clutch member 142 in the longitudinal direction via the cam faces (inclined surfaces) of the cams 142a, 143a, so that the cams 142a, 143a are disengaged from each other. Thus, the sliding engagement clutch 141 is shifted to the power transmission interrupted state, and when the speed of rotation of the output shaft 125 is reduced to below the speed of rotation of the outer ring 146 of the one-way clutch 145, the needle rollers 147 are engaged between the associated cam faces 146b and the output shaft 125 by the biasing force of the associated springs 148, and drive the output shaft 125 by a wedging action. As a result, the transmission path of the torque of the driving motor 115 is switched from the first power transmission path P1 to the second power transmission path P2, and the blade 113 is rotated at low speed and high torque which are determined by the gear ratio between the pinion gear 131 and the first intermediate gear 132 and the gear ratio between the third intermediate gear 135 and the second driven gear 136.

As described above, according to this embodiment, when the load applied to the blade 113 is low, the cutting operation can be performed on the workpiece at high speed and low torque by using the first power transmission path P1 having a low gear ratio. On the other hand, when the load applied to the blade 113 is high, the cutting operation can be performed on the workpiece at low speed and high torque by using the second power transmission path P2 having a high gear ratio.

With such a construction in which the torque transmission path is automatically switched from the high-speed low-torque first power transmission path P1 to the low-speed high-torque second power transmission path P2 according to the load applied to the blade 113, compared with a circular saw having no speed change mechanism, the driving motor 115 is prevented from being burnt, and the amount of cutting operation on a single charge of the battery 108 can be increased.

Particularly, in this embodiment, switching from the first power transmission path P1 to the second power transmission path P2 can be made in the state in which the gears in the gear trains forming the speed change mechanism 117 are held engaged with each other, or in which the positions of the gears are fixed. Therefore, speed changing operation can be performed more smoothly.

Further, according to this embodiment, with the construction in which the sliding engagement clutch 141 is provided on the intermediate shaft 123 and the one-way clutch 145 is provided on the output shaft 125, switching of the transmission path from the first power transmission path P1 to the second power transmission path P2 can be achieved simply by controlling the operation of the sliding engagement clutch 141. Thus, the rational speed change mechanism 117 can be obtained.

Further, in this embodiment, by the arrangement of the sliding engagement clutch 141 on the intermediate shaft 123 which rotates at higher speed and lower torque than the output shaft 125, the load on the sliding engagement clutch 141 can be reduced. Therefore, such a construction is effective in protecting the clutch or improving the durability of the clutch. Further, in terms of the arrangement of the shafts with respect to the gear housing 107, the intermediate shaft 123 is disposed toward the center of the gear housing 107. Therefore, by disposing the sliding engagement clutch 141 which is larger in the radial direction than the one-way clutch 145, on the intermediate shaft 123, the gear housing 107 can be prevented from increasing in size.

The one-way clutch 145 is provided on the output shaft 125. The second driven gear 136 on the output shaft 125 on the speed reduced side has a larger diameter than the third intermediate gear 135 on the intermediate shaft 123. Therefore, by disposing the one-way clutch 145 between the output shaft 125 and the second driven gear 136, a mounting space for the one-way clutch 145 can be easily secured, so that the one-way clutch 145 can be easily mounted.

In a construction in which the sliding engagement clutch 141 is automatically shifted according to the load applied to the blade 113, if the load applied to the blade 113 fluctuates around the switching set value defined by the clutch spring 144, the sliding engagement clutch 141 is frequently shifted. Therefore, in order to solve such a problem, the speed change mechanism 117 according to this embodiment is provided with a latching mechanism 151 and a reset mechanism. Once the sliding engagement clutch 141 is shifted to a power transmission interrupted state, the shifted state is retained by the latching mechanism 151. The reset mechanism serves to return it to the initial state or power transmission state after stop of the cutting operation (when the driving motor 115 is stopped).

The latching mechanism 151 is now explained mainly with reference to FIGS. 6, 7, 9 and 10. When the drive side clutch member 142 of the sliding engagement clutch 141 is moved to the power transmission interrupted position, the latching mechanism 151 serves to retain the drive side clutch member 142 in the power transmission interrupted position, or particularly in the position in which the cams 142a of the drive side clutch member 142 are separated (opposed with a clearance) from the cams 143a of the driven side clutch member 143. The latching mechanism 151 mainly includes the above-described torque ring 152.

In the housing space 153 which is formed in the drive side clutch member 142 in order to house the torque ring 152, an inclined surface 153c inclined upward and forward is formed on the drive side clutch member 142 in a forward region (in the direction of rotation) of each of the engagement recesses 153a with which the protrusions 152a of the torque ring 152 are engaged. When the drive side clutch member 142 is moved from the power transmission position to the power transmission interrupted position and thus brought into the power transmission interrupted state, the torque ring 152 is moved out of the housing space 153 and each of the protrusions 152a is moved onto the associated inclined surface 153c. Thus, the cams 142a of the drive side clutch member 142 are separated from the cams 143a of the driven side clutch member 143. This process is shown in FIG. 10. FIG. 10(A) shows the clutch movement, and FIG. 10(B) shows the movement of the torque ring 152 provided as the latching member. In order to achieve smooth movement of the protrusion 152a of the torque ring 152 onto the inclined surface 153c, the surface of the protrusion 152a which faces the associated inclined surface 153c is configured as an inclined surface or arcuate curved surface.

As shown in FIG. 10 on the top, in the engaged state of the cams 142a, 143a in which the drive side clutch member 142 is placed in the power transmission position, as described above, the protrusion 152a of the torque ring 152 is engaged with the associated torque transmission surface 153b in the engagement recess 153a and held in the torque transmission state. In such a state, when the load applied to the blade 113 exceeds a predetermined value (switching set value) defined by the clutch spring 144 and the drive side clutch member 142 retracts toward the power transmission interrupted position, the torque ring 152 fixed on the intermediate shaft 123 moves in the longitudinal direction, or in a direction of movement out of the housing space 153, with respect to the drive side clutch member 142. Thus, the protrusion 152a of the torque ring 152 is slipped out of the associated engagement recess 153a and disengaged from the associated torque transmission surface 153b. As a result, a difference in the rotational speed is caused between the torque ring 152 and the drive side clutch member 142 to which torque is no longer transmitted. Therefore, the torque ring 152 moves in the circumferential direction with respect to the drive side clutch member 142, and the protrusion 152a of the torque ring 152 climbs on the edge end of the inclined surface 153c (see the second from the top in FIG. 10). By this climbing movement of the protrusion 152a, the drive side clutch member 142 is pushed in the longitudinal direction. Specifically, the drive side clutch member 142 is acted upon by a force in a direction (longitudinal direction) in which the cams 142a are separated from the cams 143a of the driven side clutch member 143. Separation of the cams 142a, 143a is assisted by this force. As a result, the load applied to the cam faces of the cams 142a, 143a is lessened, so that wear of the cams 142a, 143a can be reduced, and thus fluctuations of the switching set value defined by the clutch spring 144 can be minimized.

When the drive side clutch member 142 is further retracted and the cams 142a, 143a are disengaged from each other, the torque ring 152 further moves in the circumferential direction with respect to the drive side clutch member 142. Therefore, the protrusion 152a further climbs onto the inclined surface 153c. Specifically, assistance in separation of the cams 142a, 143a by this climbing movement is continued even after disengagement of the cams 142a, 143a. Therefore, the drive side clutch member 142 is further moved away from the driven side clutch member 143 so that a clearance is created in the longitudinal direction between the cams 142a, 143a. The protrusion 152a climbs on the inclined surface 153c and is engaged with a stopper surface 153d extending upright from the front end of the inclined surface 153c. Thereafter, the torque ring 152 and the drive side clutch member 142 rotate together. This state is shown in FIG. 11(B) on the bottom.

Specifically, when the drive side clutch member 142 is shifted from the power transmission state to the power transmission interrupted state, the torque ring 152 further retracts the drive side clutch member 142 past the power transmission interrupted position in which the cam 142a of the drive side clutch member 142 is disengaged from the cam 143a of the driven side clutch member 143, or to an isolated position in which a predetermined clearance is secured in the longitudinal direction between the cams 142a, 143a, and retains it in this isolated position. Thus, once the sliding engagement clutch 141 is shifted to the power transmission interrupted state, it retains the shifted state regardless of the load applied to the blade 113. Therefore, even if the load applied to the blade 113 fluctuates around the switching set value defined by the clutch spring 144, stable cutting operation can be realized at low speed and high torque via the second power transmission path P2. Further, with the construction in which the drive side clutch member 142 is moved to the isolated position and held in the isolated position so that a certain clearance is secured in the longitudinal direction between the cams 142a, 143a, a reliable power transmission interrupted state can be obtained, and noise and vibration can be prevented from being caused by contact between the cams 142a, 143a.

When the driving motor 115 is stopped after completion of the cutting operation, a brake of the driving motor 115 is activated. Then, the rotational speed of the intermediate shaft 123 is reduced, so that a difference is caused in the rotational speed between the torque ring 152 which rotates together with the intermediate shaft 123 and the drive side clutch member 142 which tends to maintain its rotational speed by inertial torque. Thus, the two members 152, 142 rotate with respect to each other in the circumferential direction, or particularly in the direction in which the protrusion 152a of the torque ring 152 climbs down the inclined surface 153c of the drive side clutch member 142. Therefore, the protrusion 152a is engaged in the engagement recess 153a of the housing space 153. Specifically, the torque ring 152 is returned (reset) to its initial position, so that the power transmission interrupted state held by the sliding engagement clutch 141 is automatically released. Thus, the reset mechanism is formed by utilizing the brake of the driving motor 115 and the inertia of the drive side clutch member 142. When the power transmission interrupted state held by the torque ring 152 is released, the drive side clutch member 142 is moved to the power transmission position by the biasing force of the clutch spring 144, so that it gets ready for the next cutting operation.

In this embodiment, the circular saw 101 has the speed change mechanism 117 which is designed such that a power transmission path can be automatically switched from the high-speed low-torque first power transmission path P1 to the low-speed high-torque second power transmission path P2 when the sliding engagement clutch 141 is shifted from the engaged state to the disengaged state according to the load applied to the blade 113. This circular saw 101 further has a speed change indicating device which indicates in advance to the user the drive status conditions of the blade 113 and imminent speed change (the time of switching from the first power transmission path P1 to the second power transmission path P2) via the speed change mechanism 117. The state in which the blade 113 is driven at high speed and low torque via the first power transmission path P1 and the state in which the blade 113 is driven at low speed and high torque via the second power transmission path correspond to the "first drive mode" and the "second drive mode", respectively, according to this invention.

The speed change indicating device mainly includes a detecting device to detect positional information about members which move for speed change in the speed change mechanism 117 and detecting information about load on the blade 113, an indicating device to indicate the drive status conditions and imminent speed change of the speed change mechanism 117 to the user, and a controller (controlling device) for outputting commands for the indicating device to indicate these status conditions based on input of a detection signal from the detecting device. Embodiments of the speed change mechanism are now described.

Embodiment 1

In embodiment 1, as shown in FIGS. 3 and 4, the detecting device includes non-contact sensors in the form of two Hall element sensors 161, 163 for detecting a magnet 165 disposed on the drive-side clutch member 142 of the sliding engagement clutch 141, and a current sensor (not shown) for detecting a load current value of the driving motor 115. The indicating device comprises an illuminator 167 (see FIG. 1)

including an LED light which can illuminate either one or both of an area of a workpiece to be worked on by the blade 113 and a front end region (right end region as viewed in FIG. 1) of the base 111 in which a notch or top guide for positioning with respect to a cutting-plane line marked on the workpiece is formed. The illuminator 167 is mounted on a front end portion of a side of the blade case 104. The illuminator 167 is a feature that corresponds to the "light emitting element" according to this invention. The area of the workpiece to be worked on and the front end region of the base 111 as described above are areas which need to be illuminated for operation and correspond to the "area of operation" according to this invention.

The Hall element sensors 161, 163 are mounted to the gear housing 107 and detects the position of a member which causes speed change according to the load on the blade 113 or the drive-side clutch member 142 of the sliding engagement clutch 141 which changes in position in the longitudinal direction. The drive-side clutch member 142 is a feature that corresponds to the "switching actuation member" according to this invention. Further, the magnitude of load on the blade 113 is detected from the load current value of the driving motor 115 which is inputted from the current sensor.

When the one Hall element sensor 161 outputs an ON signal and the other Hall element sensor 163 outputs an OFF signal, the controller determines that the drive-side clutch member 142 of the sliding engagement clutch 141 is located in an engaged position and it is being driven at high speed and low torque (via the first power transmission path P1 through which torque is transmitted by using the second intermediate gear 133 and the first driven gear 134 between which the speed reduction ratio is lower). On the other hand, when the Hall element sensor 161 outputs an OFF signal and the Hall element sensor 163 outputs an ON signal, the controller determines that the drive-side clutch member 142 is located in a disengaged position and it is being driven at low speed and high torque (via the second power transmission path P2 through which torque is transmitted by using the third intermediate gear 135 and the second driven gear 136 between which the speed reduction ratio is higher). Further, the controller determines the magnitude of load on the blade 113 based on the load current value of the driving motor 115 which is inputted from the current sensor.

During driving of the speed change mechanism 117 at high speed and low torque, when the blade 113 is put under heavy load conditions and correspondingly the load current value of the driving motor 115 which is inputted from the current sensor reaches a predetermined heavy-load current value, or in other words, when the load on the blade 113 reaches a heavy load under which the sliding engagement clutch 141 and the latch mechanism 151 which are involved in speed change of the speed change mechanism 117 initiate movement for interrupting torque transmission (see the area encircled by a two-dot chain line in FIG. 10), the controller determines that speed change is imminent. The above-described heavy load condition under which the load current value of the driving motor 115 reaches a predetermined heavy-load current value corresponds to the "predetermined status condition" according to this invention.

The illuminator 167 indicates several status conditions relating to the drive status conditions of the speed change mechanism 117 and load conditions, in different colors, intensities or ways of lighting, based on commands from the controller. In embodiment 1, the drive of the speed change mechanism 117 via the high-speed low-torque first power transmission path P1 is indicated by lighting in white, and the heavy-load drive at the high speed and low torque is indicated by blinking in white, while the drive via the low-speed high-torque second power transmission path P2 is indicated by lighting in yellow, and the heavy-load drive at the low speed and high torque is indicated by blinking in yellow.

Specifically, when, based on information from the Hall element sensors 161, 163 and the current sensor, the controller verifies that the drive side clutch member 142 is located in the engaged position and the load current value of the driving motor 115 is yet below the predetermined heavy-load current value, the controller determines that the speed change mechanism 117 is being driven at high speed and low torque and outputs a command to light up the illuminator 167 in white. Further, when the controller verifies that the drive side clutch member 142 is located in the engaged position and the load current value of the driving motor 115 has reached the predetermined heavy-load current value, the controller determines that speed change is imminent, or that the power transmission path is shortly switched from the first power transmission path P1 to the second power transmission path P2, and outputs a command to blink the illuminator 167 in white. When the controller verifies that the drive side clutch member 142 is located in the disengaged position and the load current value of the driving motor 115 is below the predetermined heavy-load current value, the controller determines that the speed change mechanism 117 is driven at low speed and high torque and outputs a command to light up the illuminator 167 in yellow. Further, when the controller verifies that the drive side clutch member 142 is located in the disengaged position and the load current value of the driving motor 115 has reached a predetermined second heavy-load current value exceeding the above-mentioned predetermined heavy-load current value, the controller determines that it is under excessive load and outputs a command to blink the illuminator 167 in yellow. The above-described status in which the load current value of the driving motor 115 has reached the predetermined second heavy-load current value corresponds to the "predetermined heavy load condition in the second drive mode" according to this invention.

Thus, according to embodiment 1, the state of high-speed low-torque drive or low-speed high-torque drive, the state of imminent speed change, and the state of heavy-load drive during low-speed and high-torque drive after speed change of the speed change mechanism 117 can be individually indicated to the user. Particularly, indication of the illuminator 167 changes from white lighting to white blinking just before the speed change mechanism 117 changes the speed from high speed and low torque to low speed and high torque, so that the imminent speed change can be indicated to the user. Therefore, during operation of cutting a workpiece, the user can be prepared for increase of power output which is caused by change of the drive status from high-speed low-torque drive to low-speed high-torque drive, or specifically prepared against reaction caused by increase of power output, for example, by securely holding the circular saw 101 in advance.

Further, in embodiment 1, imminent speed change of the speed change mechanism 117 is indicated to the user by utilizing the illuminator 167 for illuminating a position to be cut by the blade 113. Therefore, the user who is performing an operation while looking at the cutting position can reliably recognize the imminent speed change without changing the direction of eyes.

Embodiment 2

Figure 13:
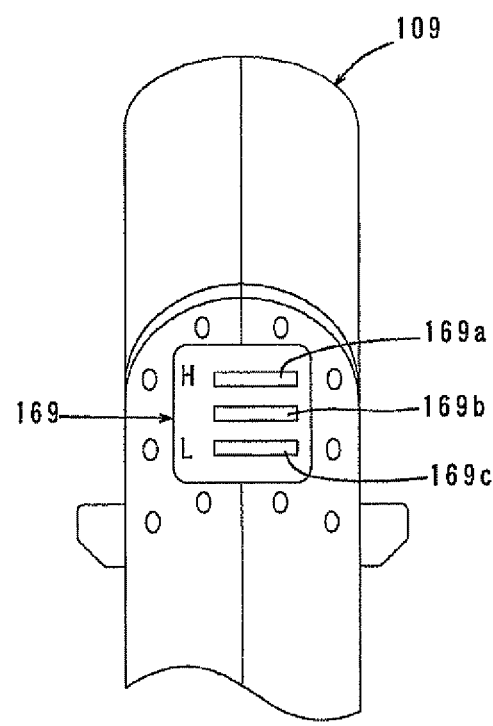
FIG. 13 shows an indicator on a handgrip.

In embodiment 2, the positional information of the drive-side clutch member 142 is outputted to the controller by using the detecting device in the form of the magnet 165 and the Hall element sensors 161, 163 like in embodiment 1. In this state, the magnitude of load on the blade 113 is detected from the rotation speed of the output shaft 125 by a rotation sensor (not shown), and the detection signal is outputted to the controller. Further, as shown in FIG. 13, an indicator 169 is provided as an indicating device in an upper surface region of the handgrip 109 which is visible to the user.

The indicator 169 includes three LED lights 169*a*, 169*b*, 169*c* disposed side by side in the longitudinal direction of the handgrip 109 and indicates not only the state of imminent speed change, but the high-speed low-torque state before speed change and the low-speed high-torque state after speed change. Specifically, the LED light 169*a* for indicating the high-speed low-torque state, the LED light 169*b* for indicating the state of imminent speed change and the LED light 169*c* for indicating the low-speed high-torque state are arranged side by side in this order from front to back (toward the user's hand).

Therefore, according to embodiment 2, by determination of the controller based on detected information about the position of the drive-side clutch member 142 and the rotation speed of the output shaft 125 which are detected by the Hall element sensors 161, 163 and the rotation sensor, respectively, any one of the three LED lights 169*a*, 169*b*, 169*c* of the indicator 169 lights up or blinks.

Specifically, when, based on information from the Hall element sensors 161, 163 and the rotation sensor, the controller verifies that the drive side clutch member 142 is located in the engaged position and the output shaft 125 is rotating at a predetermined high speed, the controller determines that the speed change mechanism 117 is being driven via the high-speed low-torque first power transmission path P1, and outputs a command to light or blink the LED light 169*a* for indicating the high-speed low-torque state. Further, when the controller verifies that the drive side clutch member 142 is located in the engaged position and the rotation speed of the output shaft 125 has been reduced to a predetermined speed, the controller determines that speed change is imminent, or that the power transmission path is shortly switched from the first power transmission path P1 to the second power transmission path P2, and outputs a command to light or blink the LED light 169*b* for indicating the state of imminent speed change. Furthermore, when the controller verifies that the drive side clutch member 142 is located in the disengaged position and the output shaft 125 is rotating at a predetermined low speed, the controller determines that the speed change mechanism 117 is being driven at low speed and high torque via the second power transmission path P2 after speed change, and outputs a command to light or blink the LED light 169*c* for indicating the low-speed high-torque state. Thus, each of the states of the speed change mechanism 117 can be individually indicated to the user according to the load on the blade 113.

Further, in embodiment 2, when the rotation speed of the output shaft 125 is further reduced to a second low speed lower than the above-described predetermined low speed during driving at low speed and high torque, this state can be detected by the rotation sensor and indicated by changing the manner of indication of the LED light 169*c* for indicating the low-speed high-torque state, or by an additionally provided emergency LED light.

Embodiment 3

In embodiment 3, in the speed change mechanism 117, a non-contact sensor (not shown) formed by a magnet and a pickup coil detects the position of a longitudinally movable member in the form of the drive-side clutch member 142 of the sliding engagement clutch 141 for speed change. Based only on this positional information, the controller indicates the states of the speed change mechanism 117 via the indicator 169 like in embodiment 2.

Specifically, when the controller verifies, based on a detected signal from the pickup coil, that the drive side clutch member 142 is located in the engaged position closest to the driven side clutch member 143, the controller determines that the speed change mechanism 117 is being driven at high speed and low torque, and outputs a command to light or blink the LED light 169*a* of the indicator 169 for indicating the high-speed low-torque state. Further, when the controller verifies, based on a detected signal from the pickup coil, that the drive side clutch member 142 is moved away from the driven side clutch member 143 and located midway between the engaged position and the disengaged position, the controller determines that speed change is imminent, and outputs a command to light or blink the LED light 169*b* for indicating the state of imminent speed change. Furthermore, when the controller verifies, based on a detected signal from the pickup coil, that the drive side clutch member 142 is located in the disengaged position completely separated from the driven side clutch member 143, the controller determines that the speed change mechanism 117 is being driven at low speed and high torque after speed change, and outputs a command to light or blink the LED light 169*c* for indicating the low-speed high-torque state. Thus, each of the states of the speed change mechanism 117 can be individually indicated to the user according to the load on the blade 113.

As for the speed change indicating device, it is not limited to the above-described embodiments 1 to 3, but various changes or modifications can be made. For example, in embodiments 1 to 3, it is constructed to detect and indicate several different states, but it is only essential to detect and indicate imminent speed change of the speed change mechanism 117 from high-speed low-torque drive to low-speed high-torque drive. In this case, it may be constructed to detect imminent speed change only by detection of the load current value of the driving motor 115, only by detection of the rotation speed of the output shaft 125, or only by positional information of a movable member involved in switching movement for speed change of the speed change mechanism 117, or by varying combinations of them.

Further, in the above-described embodiments, the drive status conditions and imminent speed change are indicated to the user by visual indication using the illuminator 167 for illuminating a cutting position or the LED lights 169*a*, 169*b*, 169*c* disposed on the handgrip 109. The indicating device may however be changed to an aural perception system, for example, using a buzzer, or a haptic perception system, for example, by feeling the temperature or vibration of the handgrip 109.

The speed change mechanism 117 according to this embodiment is described as being of a parallel three-shaft type, but it may be of a two-shaft type having two parallel shafts, or an input shaft and an output shaft. Further, it may be of a type in which the one-way clutch 145 is disposed on the intermediate shaft 123 side. Further, in this embodiment, the battery-powered circular saw 101 is described as a representative example of a power tool according to the invention, but it is not limited to this. This invention can also be applied to an AC-powered circular saw as well as the battery-powered circular saw, and to a tabletop circular saw and a tabletop slide circular saw which perform a cutting operation on a workpiece placed on a table of a base, as well as the hand-held circular saw as shown in the drawings, and also to a circular saw for woodworking or metalworking.

Further, this invention can also be applied to a cutting tool other than a circular saw, such as an electric cutter, and a cutting tool having a reciprocating tool bit, such as a reciprocating saw and a jigsaw. Moreover, it can be widely applied to various kinds of power tools other than a cutting tool, such as a sander and a grinder which perform grinding or polishing operation on a workpiece by a rotating sanding disc or grinding wheel, a driver drill for screw tightening or drilling operation, a driver and a wrench for screw tightening operation, various kinds of drills for drilling operation, and a hedge trimmer for trimming a hedge by reciprocating upper and lower blades in opposite directions. The illumination area which needs to be illuminated by the illuminator 167 for operation varies by the power tool used.

Further, this invention is effectively applied to a power tool, such as a sander and a diamond core drill, in which a load applied to the tool bit varies in one power tool, for example, with variations in the size of the tool bit used or with variations in workpieces.

Further, in this embodiment, the latching mechanism 151 is provided such that, once the sliding engagement clutch 141 is shifted to a power transmission interrupted state, the shifted state is retained by the latching mechanism 151, but it may have a construction not having the latching mechanism 151.

Having regard to the aspect of the above described invention, following aspects may be provided.

(Aspect 1)
"The position of the switching actuation member is detected by a non-contact sensor."

(Aspect 2)
"The switching actuation member is one of component parts forming the speed change mechanism"

(Aspect 3)
"The power tool includes a drive source in the form of a motor, a position sensor for detecting a position of the switching actuation member, and a current sensor for detecting a load current value of the motor, and when the first drive mode is detected and the load current value exceeds a predetermined reference value, switching from the first drive mode to the second drive mode is indicated."

(Aspect 4)
"The power tool includes a position sensor for detecting a position of the movable element, and a rotation sensor for detecting a rotation speed of an output shaft of the speed change mechanism, and when the first drive mode is detected and the rotation speed of the output shaft exceeds a predetermined reference value, switching from the first drive mode to the second drive mode is indicated."

(Aspect 5)
"A predetermined heavy load condition in the second drive mode is also detected and indicated."

(Aspect 6)
"The light emitting element indicates several drive status conditions of the speed change mechanism and load conditions of the tool bit, in different colors, intensities or ways of lighting."

(Aspect 7) "The power tool includes a power tool body that houses a motor and the speed change mechanism and a base which is disposed below the power tool body and can be placed on a workpiece, and the tool bit is configured as a saw blade which is rotationally driven via the speed change mechanism by the motor and thereby cuts a workpiece."

(Aspect 8)
"The predetermined status condition is detected by a current sensor for detecting a load current value of the motor."

(Aspect 9)
"The predetermined status condition is detected by a rotation sensor for detecting a rotation speed of an output shaft in the speed change mechanism."

(Aspect 10)
"The speed change mechanism as defined in claim 3 includes first and second rotating shafts disposed parallel to each other, and first and second gear trains having different gear ratios and each having a combination of a drive gear and a driven gear as one unit which are engaged with each other and transmit torque of the first rotating shaft to the second rotating shaft, wherein a torque transmission path via the first gear train is defined as a first power transmission path and a torque transmission path via the second gear train is defined as a second power transmission path, and further includes a first clutch which allows and interrupts power transmission on the first power transmission path and a second clutch which allows and interrupts power transmission on the second power transmission path, and the power transmission path is switched between the first and second power transmission paths while the first and second gear trains are held engaged, by shifting of the first and second clutches between the power transmission state and the power transmission interrupted state according to a load applied to the tool bit."

DESCRIPTION OF NUMERALS 101 circular saw (power tool)
103 circular saw body (power tool body)
104 blade case
105 motor housing
106 safety cover
107 gear housing
108 battery
109 handgrip
109a trigger
111 base
111a opening
113 blade (tool bit)
115 driving motor (power source)
116 motor shaft
117 speed change mechanism
121 input shaft
121a bearing
123 intermediate shaft (first rotating shaft)
123a bearing
125 output shaft (second rotating shaft)
125a bearing
131 pinion gear
132 first intermediate gear
133 second intermediate gear
134 first driven gear
135 third intermediate gear
136 second driven gear
137 key
138 bearing
139 key
141 sliding engagement clutch (first clutch)
142 drive side clutch member
142a cam
143 driven side clutch member
143a cam
144 clutch spring
145 one-way clutch (second clutch)
146 outer ring
146a cam groove 146b cam face
147 needle roller
148 spring
151 latching mechanism
152 torque ring
152a protrusion
153 housing space
153a engagement recess
153b torque transmission surface
153c inclined surface
153d stopper surface
161 Hall element sensor
163 Hall element sensor
165 magnet
167 illuminator
169 indicator
169a LED light
169b LED light
169c LED light

What we claim is:

1. A power tool comprising:
a speed change mechanism that switches a tool bit from: 1) a first drive mode in which the tool bit is driven at a predetermined speed and torque to 2) a second drive mode in which the tool bit is driven at a lower speed and higher torque than the first drive mode according to a load on the tool bit,
a detecting device that detects a predetermined status condition of the first drive mode, the predetermined status condition detected by the detecting device being defined as a predetermined heavy load condition in which the tool bit is driven at a predetermined torque condition, and
an indicating device that indicates switching from the first drive mode to the second drive mode prior to such switching such that it is preannounced that the switching will immediately occur, the switching from the first drive mode to the second drive mode being indicated when the heavy load condition is detected.

2. The power tool according to claim 1, wherein the speed change mechanism includes first and second rotating shafts disposed parallel to each other and first and second power transmission paths via which torque is transmitted from the first rotating shaft to the second rotating shaft at different speed reduction ratios, the first power transmission path being associated with the first drive mode and the second power transmission path being associated with the second drive mode, wherein the power tool further includes a switching actuation member that switches from the first power transmission path to the second power transmission path by moving according to load conditions of the tool bit.

3. The power tool according to claim 2, wherein the predetermined status condition is detected based on a position of the switching actuation member which moves according to load conditions of the tool bit.

4. The power tool according to claim 1, wherein the detecting and indicating devices respectively detect and indicate the first and second drive modes.

5. The power tool according to claim 1, wherein the detecting and indicating devices further detect and indicate a heavy load condition in the second drive mode.

6. The power tool according to claim 1, wherein the indicating device includes a light emitting element.

7. The power tool as defined in claim 6, wherein the light emitting element is provided to illuminate an area of operation of the tool bit.

* * * * *